(12) United States Patent
Chiu

(10) Patent No.: US 6,747,437 B2
(45) Date of Patent: Jun. 8, 2004

(54) PORTABLE LABOR-SAVING BATTERY DEVICE FOR ELECTRIC VEHICLE

(75) Inventor: Chien-Liang Chiu, Hsin-Chu (TW)

(73) Assignee: Wu's Tech Co., Ltd., Hsin-Chu (TW)

( * ) Notice: Subject to any disclaimer, the term of this patent is extended or adjusted under 35 U.S.C. 154(b) by 0 days.

(21) Appl. No.: 10/267,654

(22) Filed: Oct. 10, 2002

(65) Prior Publication Data

US 2004/0070365 A1 Apr. 15, 2004

(51) Int. Cl.$^7$ .................................................. H02J 7/00
(52) U.S. Cl. ...................... 320/107; 320/104; 180/68.5; 429/96
(58) Field of Search ................................ 320/107, 112, 320/127, 137; 429/96, 97, 99, 100; 180/68.5, 65.6

(56) References Cited

U.S. PATENT DOCUMENTS 5,020,624 A * 6/1991 Nesterick et al. ........... 180/210
6,095,269 A * 8/2000 Hosaka et al. ............. 180/65.6

* cited by examiner

Primary Examiner—Adolf D. Berhane
Assistant Examiner—Lawrence Luk
(74) Attorney, Agent, or Firm—Rosenberg, Klein & Lee

(57) ABSTRACT

The present invention discloses a portable labor-saving battery device for a electric vehicle, said battery device capable of providing power when installed on said electric vehicle. User is able to disassemble said battery device, drag and recharge said battery independently without much effort. Furthermore, said battery device is used as shopping cart to provide more functionality. Said battery device mainly comprises a battery set having a socket for recharge and a contact on a bottom of said battery set for connecting to said electric vehicle, a cap implemented on a bottom of a upper surface of said battery set, said cap lying next to said upper surface of said battery set when folded up and providing a load-bearing space when bent down. A wheel set is implemented on a bottom of a lower surface of said battery set for providing mobility. Said battery set having an extension bar penetrating through both sides of a top of said battery set and extending into said battery, wherein said extension bar is extensible inside said battery set for user to drag said battery device easily other than hand carry said battery set.

6 Claims, 8 Drawing Sheets

PORTABLE LABOR-SAVING BATTERY DEVICE FOR ELECTRIC VEHICLE

BACKGROUND OF THE INVENTION

1. Field of the Invention

The present invention is related to a portable labor-saving battery device for a electric vehicle, and more particularly, to a battery device which can be installed on the electric vehicle to provide power to the electric vehicle, or letting user to disassemble said battery device, drag and recharge said battery independently without much effort. In the meantime, the battery device is able to provide anti-theft capability to the electric vehicle and is used as shopping cart for diverse functions.

2. Description of the Prior Art

Electric vehicles are suitable for short-range transportation for their light, handy structures and easy operations. Besides, electric vehicles are free from air-pollution and loud noise because they are powered by electricity instead of fuel; therefore they have become the choices for short-range transportation under the trends and requirements of environmental protection. They are suitable especially for people to shop for daily supplies and for helping the seniors and the disabled.

As to electric vehicles, the most critical issue that needs improvement lies in the battery device. For the battery device acting as the only power source to the electric vehicle, the electric vehicle will lose mobility if the electric vehicle is running out of battery and recharging is required. However, due to the limitation of present technology, the battery device can only last for a few hours, it is not so durable as the fuel cell. Besides, the battery life depends on the weight of the load and the weather, thus precise calculation of battery life is not achievable and power-shortage can happen any time. One question arises when the bulky and heavy battery device needs recharging, user often finds that moving the bulky battery set to be tiresome. Furthermore, since the battery set has to be recharged in house, if electric vehicle should run out of battery at a place far from home, that much more effort is required to move the battery device. For the reasons given above, it is desirable to provide a portable labor-saving battery device for easy transportation and recharge. The portable labor-saving battery device is suitable especially for the disabled or people suffered from weakness such as the elders.

Therefore, the inventor of the present invention has consequently developed and proposed a portable labor-saving battery device for electric vehicle. The battery device can move without additional auxiliary tool and help user to ease the burden. Besides, the battery device can act as a shopping cart when user disassemble it from the electric vehicle and can provide diverse practical functions to suit user's need. Thus better usage of the battery device is achieved.

SUMMARY OF THE INVENTION

The object of the present invention is to provide a portable labor-saving battery device for electric vehicle, letting user to disassemble and drag the battery device independently. The battery device is equipped with extension bar and wheel set for better mobility and convenience, even if the user has to climb upstairs with the battery.

It is another object of the present invention to provide a battery device that acts as a shopping cart to let user go shopping at anytime without carrying additional shopping cart or bag. Thus the number of carry-on devices can be reduced, and the battery device can provide anti-theft capability to the electric vehicle.

BRIEF DESCRIPTION OF THE DRAWINGS

The drawings disclose an illustrative embodiment of the present invention, which serves to exemplify the various advantages and objects hereof, and are as follows.

DETAILED DESCRIPTION OF THE PREFERRED EMBODIMENT

Figure 1:
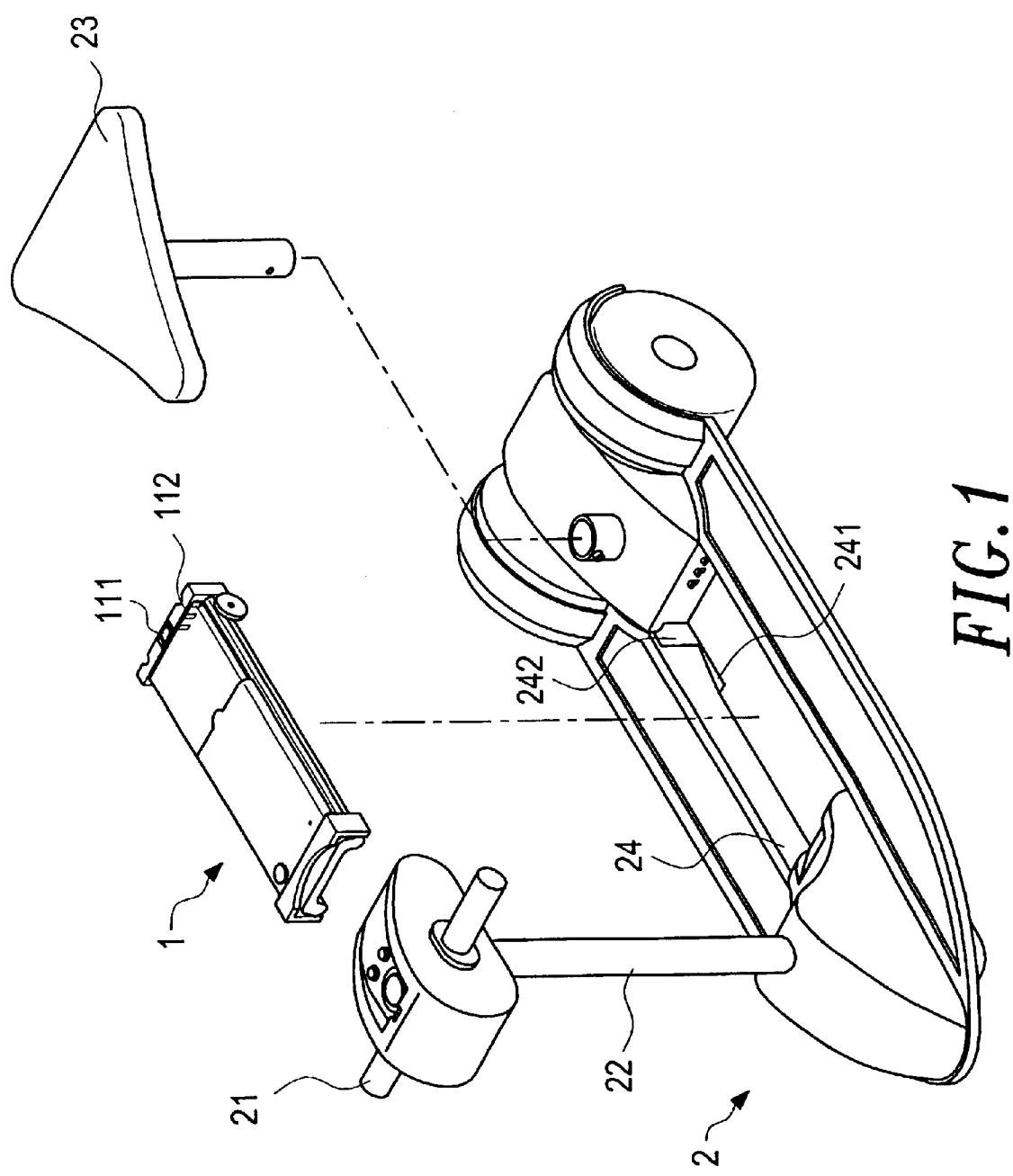
FIG. 1 shows the relative position of the battery device of the present invention and the electric vehicle.
Figure 2:
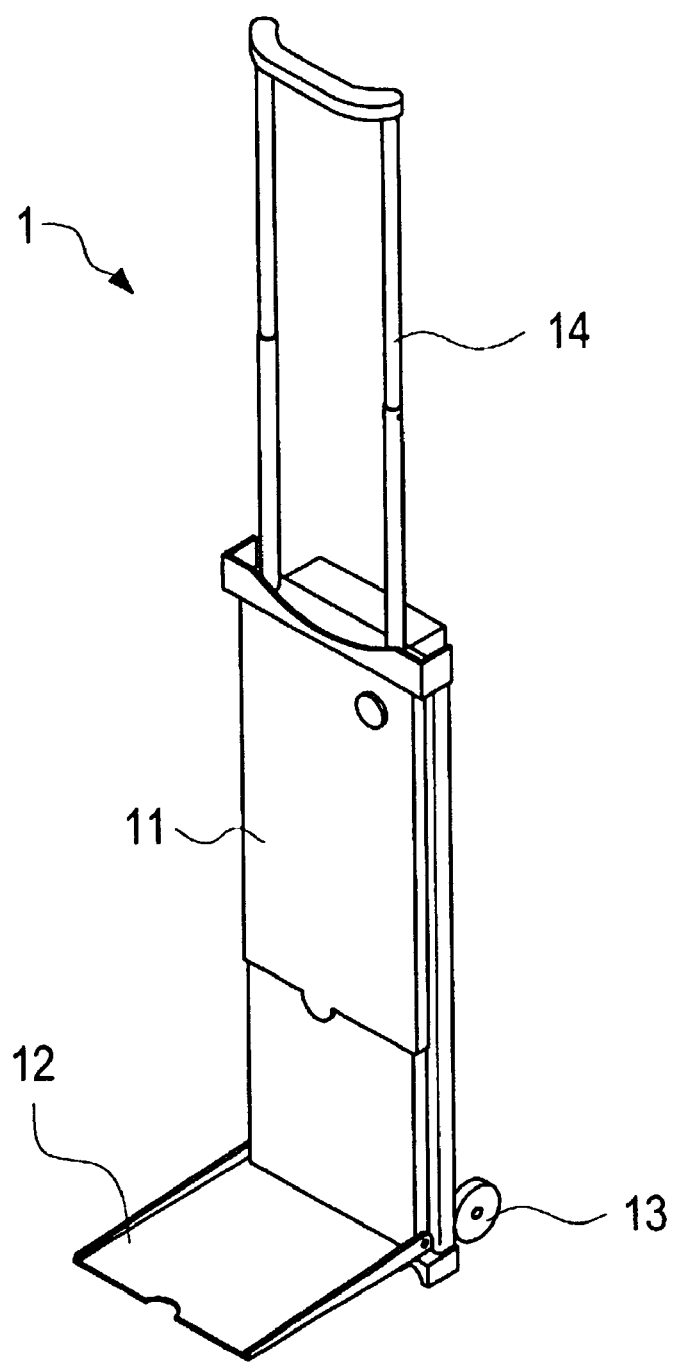
FIG. 2 show the expanded view of the battery device of the present invention.
Figure 3:
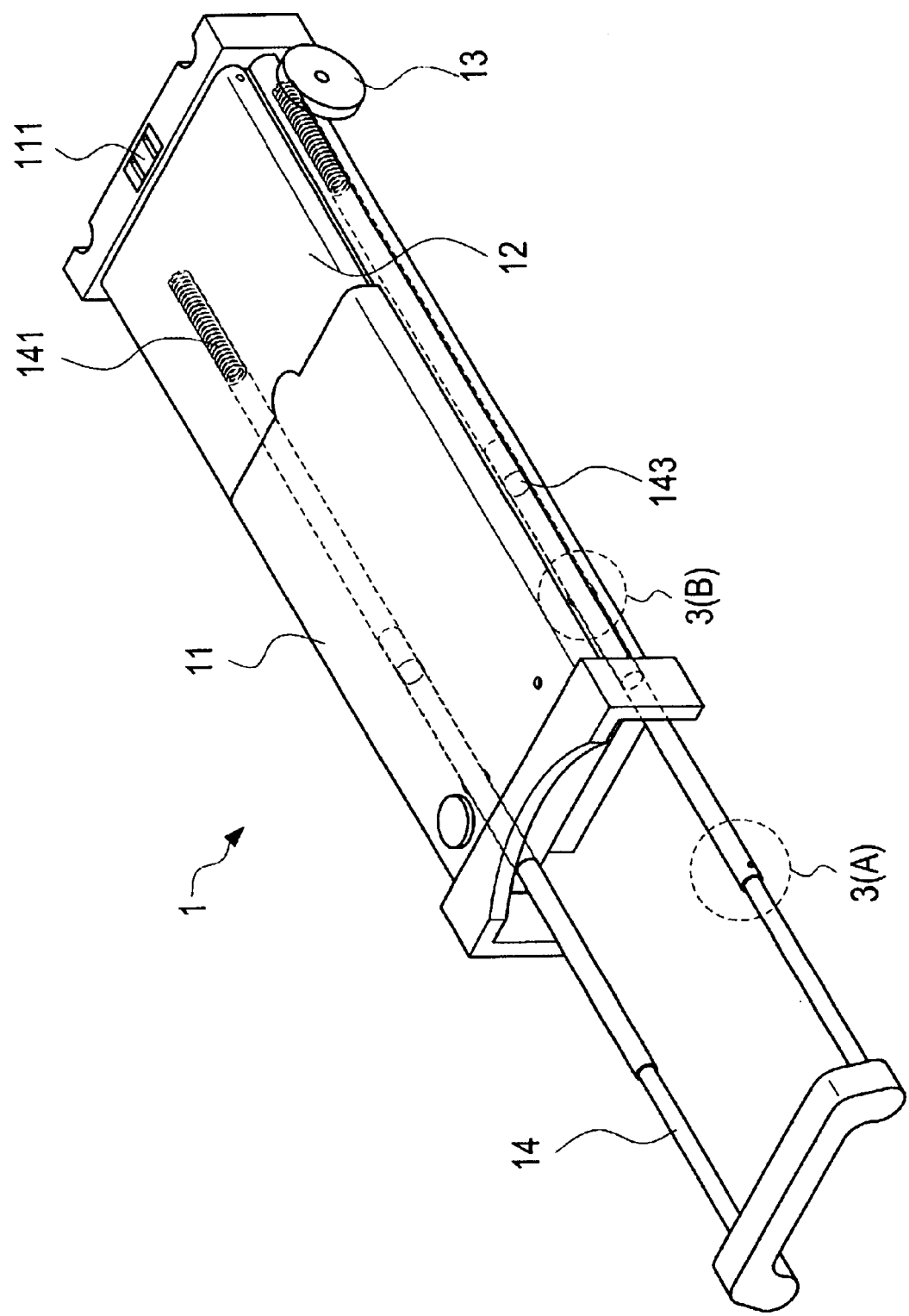
FIG. 3 shows the perspective view of the extension bar of the battery device.
Figure 3B:
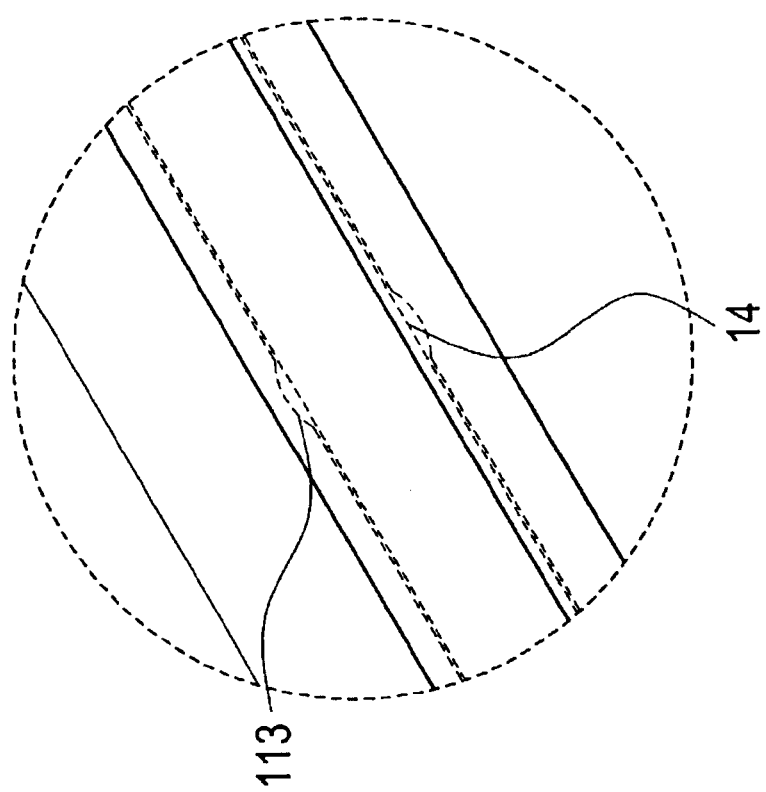
FIG. 3b is the magnified view of the extension bar fixed at a designated position.
Figure 3A:
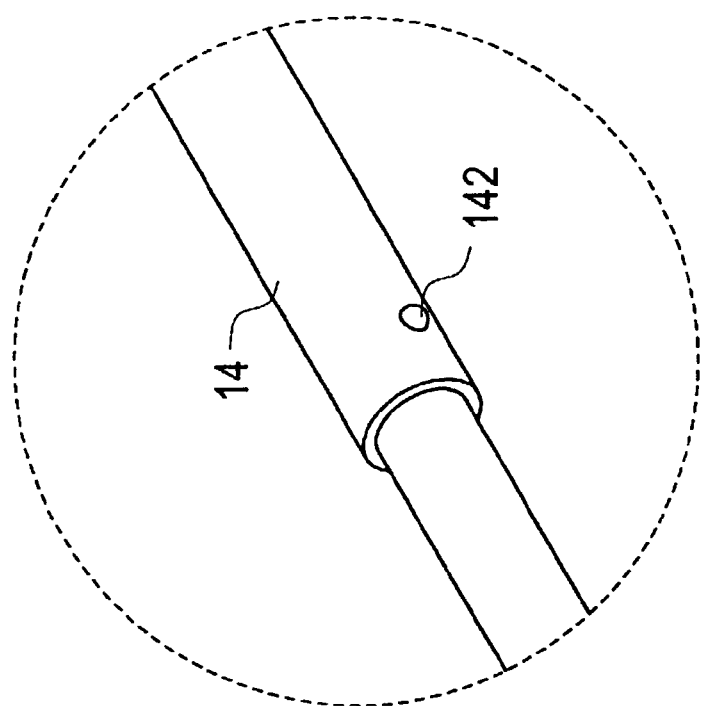
FIG. 3a is the magnified view of part of the extension bar.
Figure 4:
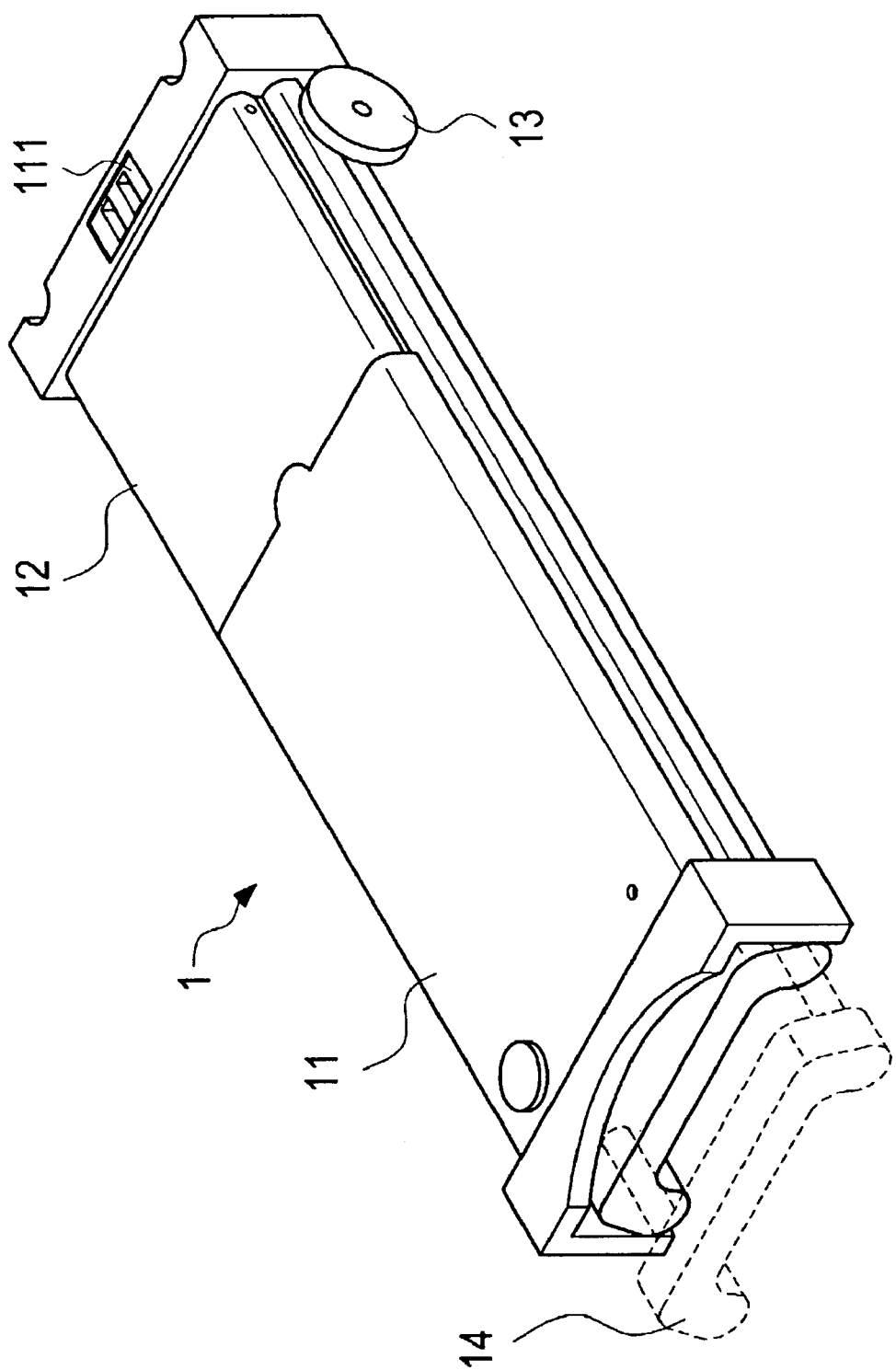
FIG. 4 shows the battery device of the present invention with the extended bar inserted inside the battery set.
Figure 5:
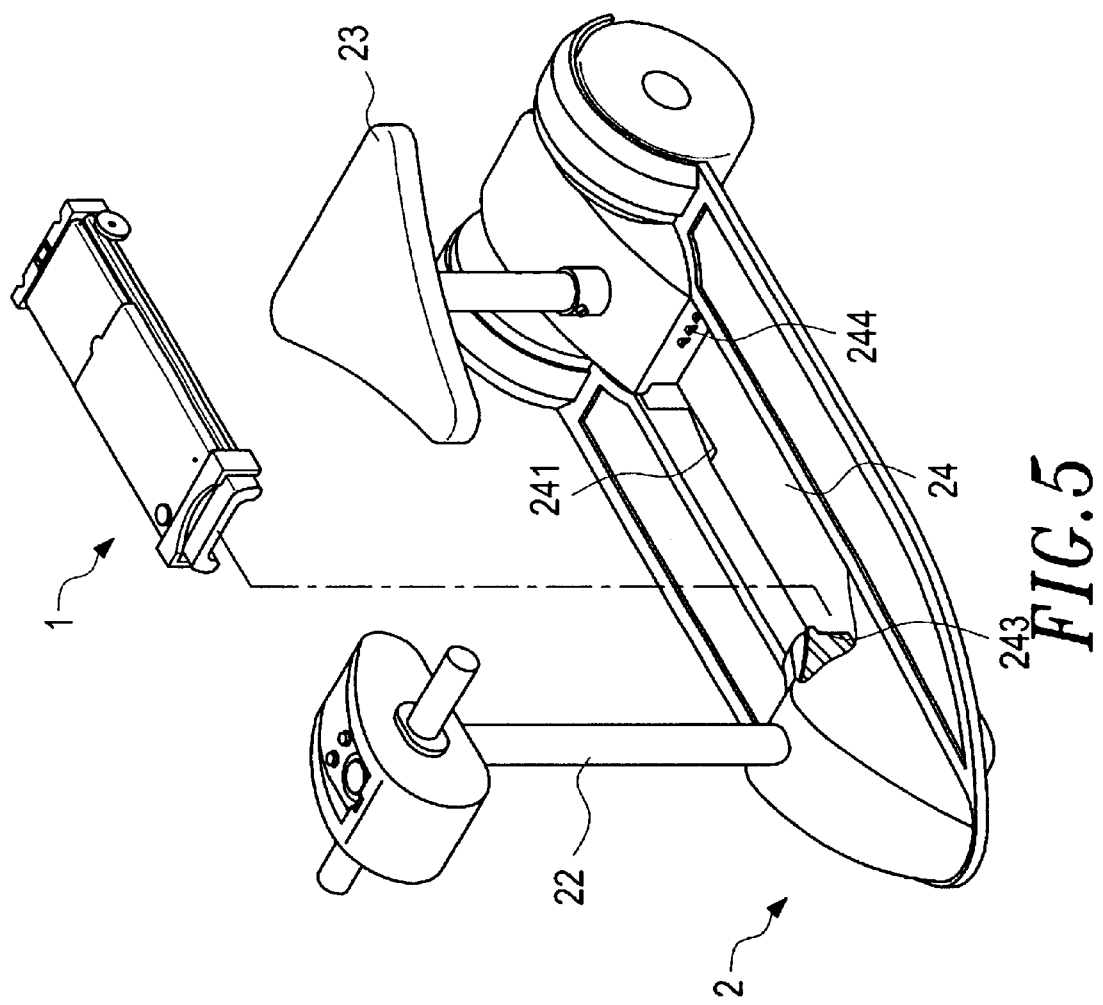
FIG. 5 shows the extension bar combining with the buckle.
Figure 6:
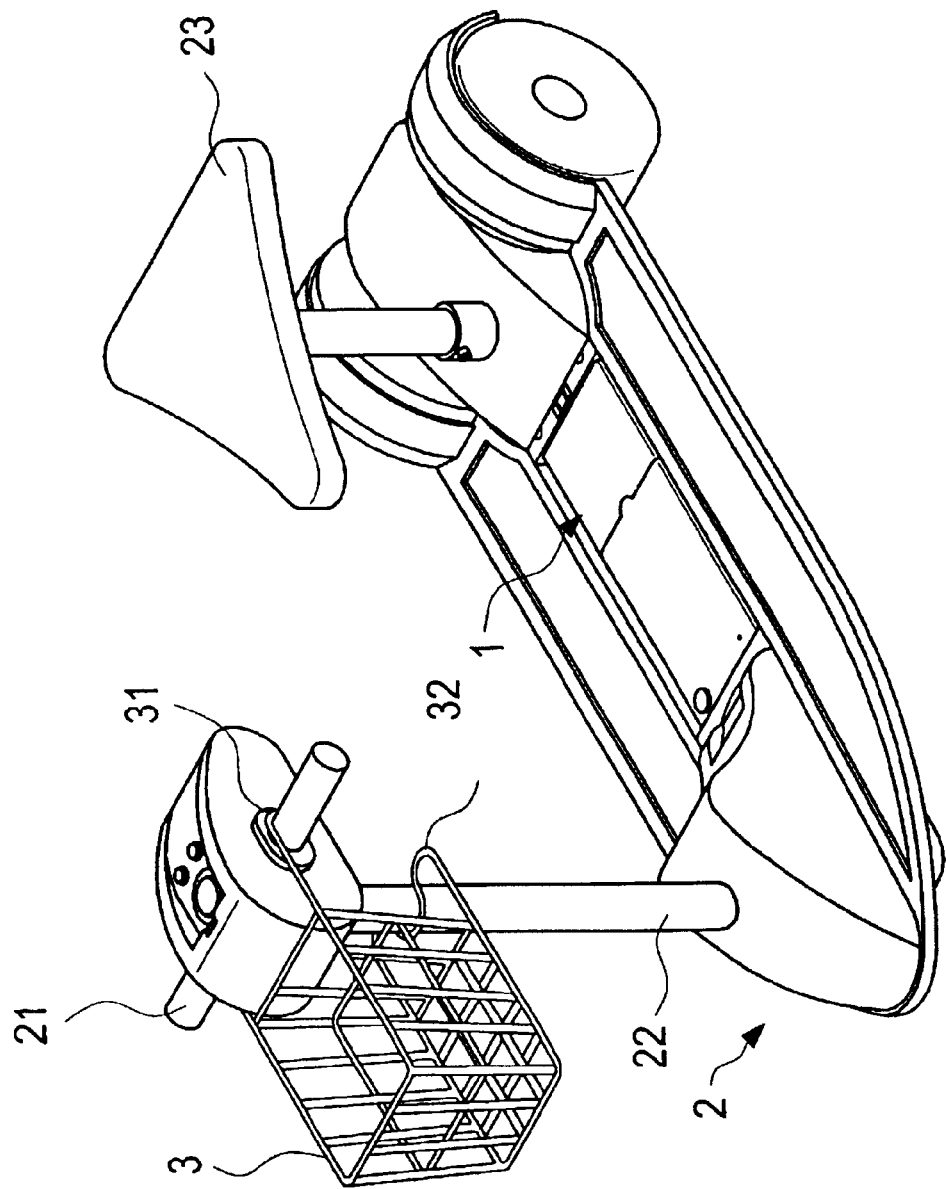
FIG. 6 shows the electric vehicle with shopping basket.
Figure 7:
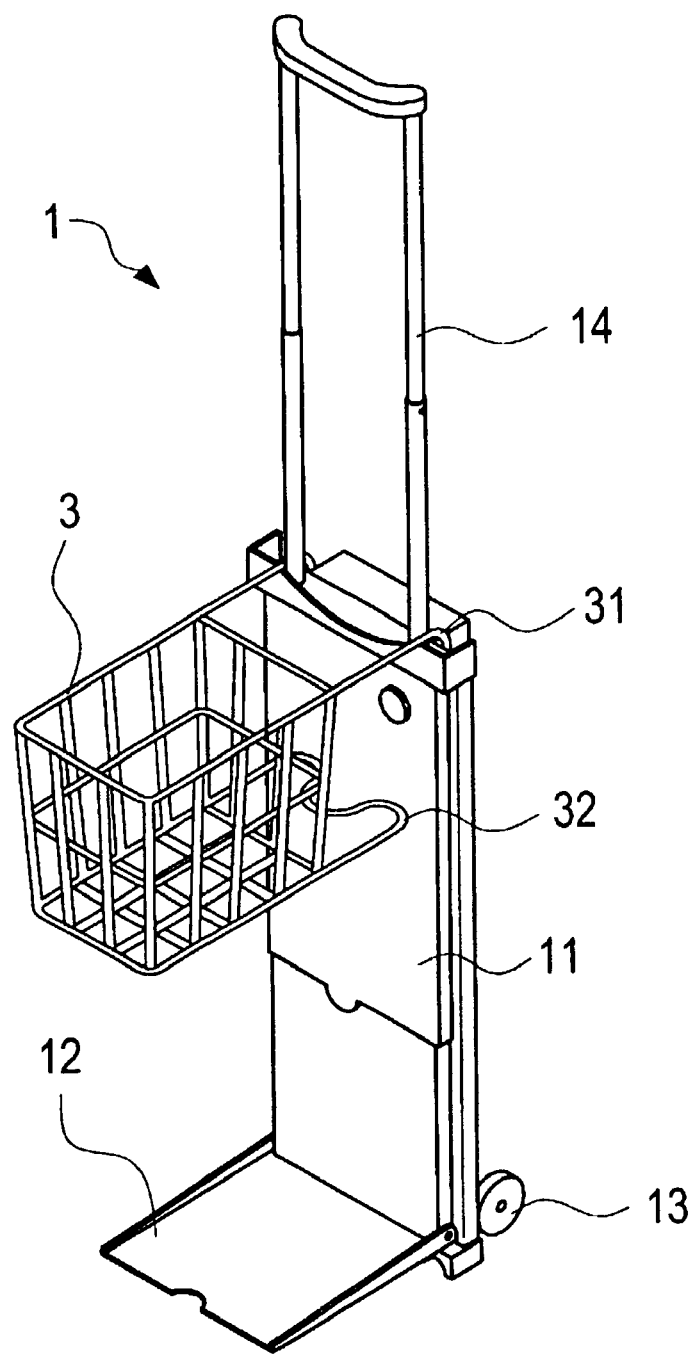
FIG. 7 shows the battery set with the shopping basket.

Please refer to FIG. 1, the present invention provides a portable labor-saving battery device for the electric vehicle. The battery device 1 mainly comprises a battery set 11 having a socket 111 on the surface, a contact 112 at the bottom, and a cap 12 connected at the end of the upper surface. The cap 12 forms a uniform surface with the battery set 11 for better look when folded up, or providing a load-bearing space when bent down. A wheel set 13 is implemented at the bottom of the lower surface of the battery set 11 to provide mobility to the battery set 11. Additionally, there is an extension bar 14 having both ends penetrating through both sides on top of the battery set 11 and extending into the battery set, wherein springs 141 are implemented at both ends of the extension bar 14 inside the battery set 11.

The battery device 1 of the present invention is suitable for various types of electric vehicles 2, wherein a handle 21 is used for controlling the movement of electric vehicle 2, an axle 22 for controlling the moving direction of electric vehicle 2, and a seat 23 for user. In the present invention, the electric vehicle 2 provides the battery device 1 with a compartment 24, which can be used to accommodate the battery set 11. There are inclinable tracks 241 implemented on both sides of the compartment 24. The inclinable tracks 241 are implemented with gap 242 for the wheel set 13 to move in and out of the compartment 24 and to get stuck in the gap 242 when sliding in. A buckle 243 is implemented at the front end of compartment 24 for the extension bar 14 to connect to the buckle 243 using the springs 243. There is a conduction contact 244 at the back end of the compartment 24 for transmitting power from contact 112 to drive the electric vehicle 2.

As described above, user can slide the battery device 1 along the track 241 by using the wheel set 13 and put the battery device 1 into compartment 24 with the wheel set 13 stuck in gap 242, then press and insert the extension bar 14 into buckle 243. Due to the elasticity of spring 141, the extension bar 14 gets stuck in the buckle 243 to hold the battery set 11. And the embedded battery set 11 forms a uniform surface with the electric vehicle 2. Through the conduction contact 244, the contact 112 provides electricity to the electric vehicle 2 for generating movements. The structure of the electric motor used in the electric vehicle 2 is well known to those who skilled in the art, therefore it will not be discussed here for the sake of brevity.

When the electric vehicle 2 runs out of battery, user can connect socket 111 to power source for recharge whenever a power source is available. But usually user can hold and press the extension bar 14 to release the battery set 11 from the buckle 243, then pull up the battery set 11 so that the wheel set 13 goes up along the track 241. Then user can move the battery set 11 out of the compartment 24 and place the battery set 11 on the ground, grab the extension bar 14 to drag the battery set 11 to suitable place for recharge.

While dragging the battery device 1 along, user can conveniently bend down the cap 12 to put suitable loads on the cap 12. In some cases, the present invention provides a shopping basket 3 and a hook 31. The hook 31 is implemented either on top of the upper edge of the battery set 11, or on the handle 21 of the electric vehicle 2. A support 32 is implemented at the lower end of the shopping basket 3 and leaning against the surface of the battery set 11. The support 32 provides a crook for clipping onto the axle 22 of electric vehicle 2. Therefore, when user is operating the electric vehicle 2, he/she may hang the shopping basket 3 to the electric vehicle 2, or hang the shopping basket 3 to the battery set 11 when he/she is dragging the battery device 1 independently. Here the battery device 1 acts like a shopping cart to provide user with more functions.

It should be noted that when the battery device 1 is disconnected from the electric vehicle 2 for user to carry independently, anti-theft capability could be achieved for no electricity is applied to the electric vehicle.

Moreover, in order to improve the usability of the extension bar 14, the extension bar 14 can be adjustable, wherein the extension bar 14 having a length adjustment portion 142 for adjusting the length of the extension bar 14 to satisfy users with different figures and habits. The battery set 11 have clasps 143 and slots 113 implemented inside an extensible portion of the battery set 11 for extending and fixing the extension bar 14 to suitable length.

The present invention discloses a portable labor-saving battery device for providing power to the electric vehicle and letting user to disassemble and drag the battery device independently. The battery device is equipped with extension bar and wheel set for better mobility and convenience. Furthermore, the battery device is used as a shopping cart to let user go shopping at anytime without carrying additional shopping cart or bag. Thus the number of carry-on devices can be reduced, and the battery device can provide anti-theft capability to the electric vehicle.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A portable labor-saving battery device for a electric vehicle, comprising:

a battery set having a socket on a surface of said battery set and a contact implemented on a bottom of said battery set;

a cap having a first end pivoting on a bottom of a upper surface of said battery set, wherein said cap lying next to said upper surface of said battery set when folded up and providing a load-bearing space when bent down;

a wheel set implemented on a bottom of a lower surface of said battery set; and an extension bar having both ends penetrating through both sides on a top of said battery set and extending into said battery set, wherein said extension bar having springs implemented at both ends of said extension bar inside said battery set.

2. The battery device as recited in claim 1, wherein said electric vehicle having a compartment for carrying said battery set of said battery device, said compartment having inclinable track implemented with gap for said wheel set to move in and out of said compartment and to get stuck in said gap when sliding in, a buckle implemented at a front end of said compartment for said extension bar to connect said buckle using said springs, a back end of said compartment having a conduction contact for transmitting power from said contact.

3. The battery device as recited in claim 1, wherein a shopping basket is hanging outside of said battery set with a hook implemented at a upper end of said shopping basket, said hook clinging to an edge of a upper end of said battery set; a support implemented at a lower end of said shopping basket, said support leaning against a first surface of said battery set.

4. The battery device as recited in claim 1, wherein a shopping basket is hanging on a handle of said electric vehicle, said shopping basket having a hook at a upper end of said shopping basket, a support implemented at a lower end of said shopping basket, said support having a crook for clinging to an axle of said electric vehicle.

5. The battery device as recited in claim 1, wherein said extension bar is extensible for length adjustment.

6. The battery device as recited in claim 1, wherein clasps and slots are implemented inside an extensible portion consisting of said extension bar and said battery set for extending and fixing said extension bar to suitable length.

* * * * *